(12) United States Patent
Saitou et al.

(10) Patent No.: US 7,385,169 B2
(45) Date of Patent: Jun. 10, 2008

(54) CONTACT IMAGE SENSOR AND METHODS FOR ALIGNING A LIGHT ELEMENT ARRAY SUBSTRATE THEREOF

(75) Inventors: Tomihisa Saitou, Minato-ku (JP); Harunobu Yoshida, Minato-ku (JP); Masahide Wakisaka, Minato-ku (JP); Masaki Kitaoka, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 11/516,888

(22) Filed: Sep. 7, 2006

(65) Prior Publication Data

US 2007/0057151 A1   Mar. 15, 2007

(30) Foreign Application Priority Data

| Sep. 8, 2005 | (JP) | ............................. 2005-260582 |
| Aug. 11, 2006 | (JP) | ............................. 2006-219565 |
| Sep. 5, 2006 | (JP) | ............................. 2006-240300 |

(51) Int. Cl.
  *H01L 27/00* (2006.01)
(52) U.S. Cl. .................. 250/208.1; 250/216; 250/235; 358/482; 358/514

(58) Field of Classification Search ............. 250/208.1, 250/214.1, 216, 235; 355/67–69; 257/13, 257/79–103, 678, 918, E51.018–E51.022, 257/E33.001–E33.077, E33.054, E25.028, 257/E25.032; 358/482, 483, 512–514

See application file for complete search history.

(56) References Cited

U.S. PATENT DOCUMENTS

| 6,357,903 | B1 * | 3/2002 | Furusawa et al. ........... 362/555 |
| 2005/0006562 | A1 * | 1/2005 | Sugihara et al. ......... 250/208.1 |
| 2005/0040321 | A1 * | 2/2005 | Wakisaka et al. ........... 250/216 |

* cited by examiner

*Primary Examiner*—Georgia Epps
*Assistant Examiner*—Franics M LeGasse, Jr.
(74) *Attorney, Agent, or Firm*—RatnerPrestia

(57) ABSTRACT

A contact image sensor is provided including a housing, a slit plate a lens, one or two light sources and a light-receiving element array mounted on a light-receiving element array substrate. The housing contains the slit plate, the lens, the one or two light sources and the light-receiving element array substrate. The optical system of the contact image sensor is aligned and one or more depressions are formed on an end of the substrate for the alignment. Power to the one or two light sources is applied through one or more leads. Each of the one or more depressions is large enough so that each of the leads can be passed through the respective depressions.

16 Claims, 17 Drawing Sheets

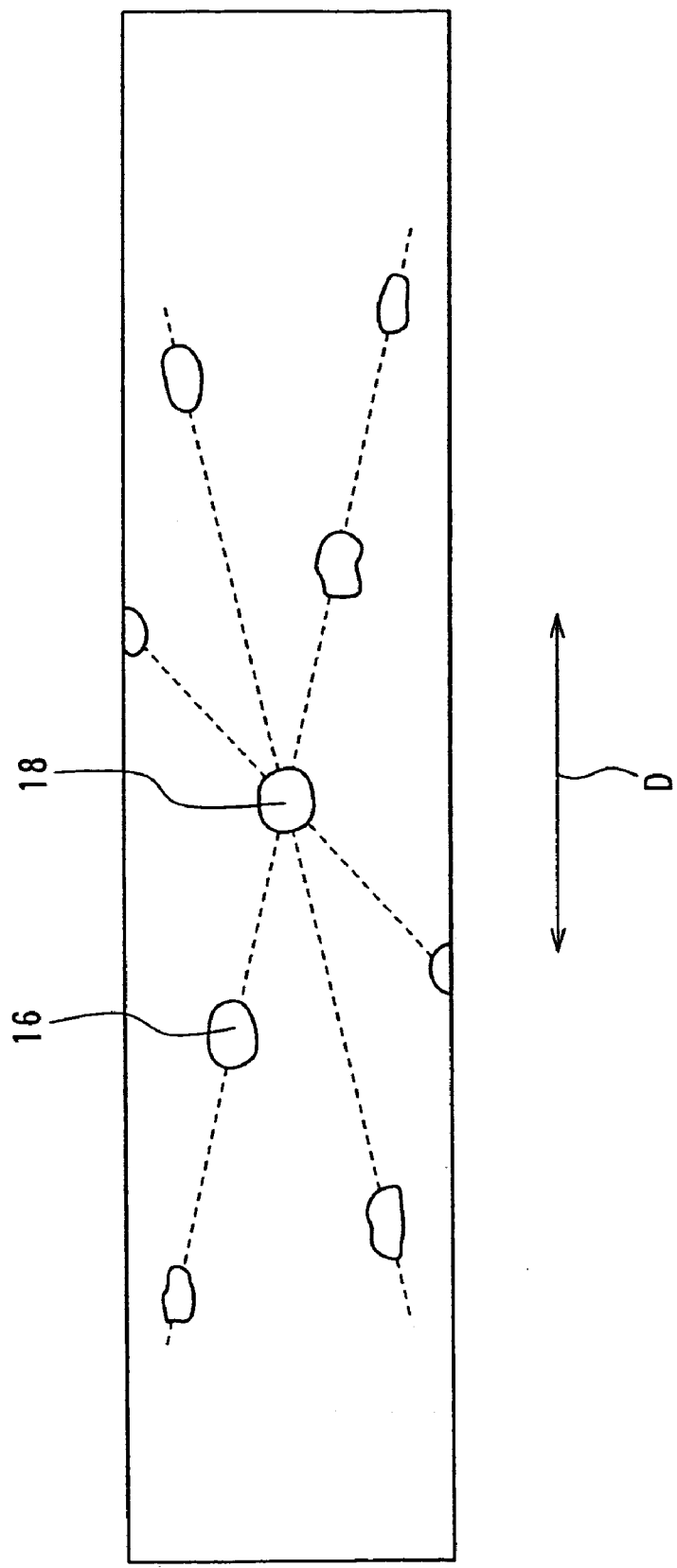

CONTACT IMAGE SENSOR AND METHODS FOR ALIGNING A LIGHT ELEMENT ARRAY SUBSTRATE THEREOF

BACKGROUND OF THE INVENTION

1. Field of the Invention

The present invention relates to a method for aligning a light-receiving element array substrate provided in a contact image sensor in a sub-scanning direction, a method for manufacturing the contact image sensor, and the contact image sensor.

2. Related Background Art

A contact image sensor, which enables reading the image of an original, comprises a light source, a lens, a light-receiving element array (e.g. CCD) and a housing for containing them. The original is irradiated by light from the light source, the lens focuses the light reflected from the original on the light-receiving element array, and the light-receiving element array receives the focused light. Although the light reflected from the original enters the lens and the light-receiving element in the contact image sensor receives the focused light by the lens, ghost images may be generated by the structure of an optical system causing a decrease in an image quality. Ghost images are a phenomenon such that a virtual image is generated in an image area in which an original image doesn't normally exist. The alignment of components, such as the light source, the lens, and the light-receiving element array, in the contact image sensor is important to prevent ghost images from being generated.

Conventionally, a rod lens array is used for the lens provided in the contact image sensor. An example of a rod lens array is disclosed in Japanese Patent Publication No. 1993-167778. Because the rod lens array is formed with a combination of a plurality of rod lenses disposed in an array configuration, each of the incident rays that enter the plurality of rod lenses generally has an optical path toward one of the plurality of rod lenses. Thus it is rare that the incident ray which enters into one rod lens enters into another adjacent rod lens. Therefore, in case that the rod lens array is used for the lens, ghost images are not typically generated. In addition, the rod lens array is generally formed by containing a light-shielding film between the rod lenses to obtain a more high-quality image, so that unnecessary light may not be entered into the adjacent rod lens.

As described above, the rod lens array has a structure such that ghost images are not typically generated. In case that the rod lens array is used for the contact image sensor, the precise alignment for the components, such as the rod lens array and the light-receiving element array, is typically not carried out.

However, a micro-lens array plate has more recently been used in contact image sensors instead of the rod lens array. On the micro-lens array plate, it is difficult to integrally form such a light-shielding film between micro-lenses, because the micro-lens array plate is formed integrally in the manufacturing process by means of injection molding of resin. In addition, the structure of the micro-lens array plate makes it easy to transmit unnecessary light when forming an image, since each of micro-lenses in the micro-lens array plate does not have a separate structure as compared with the rod lens array. Therefore, ghost images become a significant matter when utilizing the micro-lens array plate for the lens of a contact image sensor as opposed to utilizing the rod lens array for the lens of the contact image sensor where ghost images are not typically generated.

To prevent ghost images from being generated, it is generally disclosed, for example in Japanese Patent Publication No. 1999-331498 to form the light-shielding film into the micro-lens array plate in another additional process, and to form a slit opening in a slit plate located between the original and the micro-lens array plate. Even if the slit plate is used, however, ghost images may be generated when precise alignment among the slit plate, the lens and the light-receiving element array is not carried out. Therefore, it is especially important that each of the components, such as the slit plate, the lens and the light-receiving element array, are precisely aligned in a sub-scanning direction with respect to the optical system in the contact image sensor.

Additionally, a linear illuminating device is generally used for the light source provided in the contact image sensor. The linear illuminating device is typically composed of a plurality of light-emitting elements, such as light-emitting diodes or light-emitting thyristors which are linearly mounted on a light-emitting element array substrate that is composed of one or more of the light-emitting elements designed on one end of a translucent linear light-guide, for example. In such a linear illuminating device, it is necessary to align a positioning relationship between the slit plate and the lens to prevent ghost images from being generated, and to align a positioning relationship between the slit plate and the lens for increasing sensor-output, which corresponds to increasing of amount of light. The sensor-output, as described herein indicates a value of an output voltage of the contact image sensor, the output voltage being a value from a photo-electric converted signal by means of the light-receiving element array. An example of technology for aligning an array-line of the light-receiving element array such that a positioning relationship between a slit opening in a slit plate and an array-line of the light-receiving element array becomes parallel is disclosed in Japanese Patent Publication No. 1993-122443.

When the micro-lens array plate is used for the contact image sensor, as described above, the precise alignment of the micro-lens array plate, the slit plate and the light-receiving element array is needed. In order to carry out a precise alignment, the presence or absence of ghost images is desirably confirmed. A generalized method of checking for the presence or absence of ghost images is to read a whole area of a test chart 12 including round patterns 10 (as shown in FIG. 1A) through the optical system of the contact image sensor, and then to read the output image of the sensor-output. In this case, if the positioning relationship among the micro-lens array plate, the slit plate and the light-receiving element array is misaligned, ghost images 16 may appear as output image 14, as shown in FIG. 1B. In contrast, output image 18, shown in FIG. 1B is an actual image of the round patterns 10.

However, when the test chart 12 shown in FIG. 1A is used, there is a problem of taking more time for the alignment because the whole area of the test chart 12 should be read, and of a difficulty of online alignment.

Moreover, the light source provided in the contact image sensor generally has an irregular distribution of amount of light. In addition, in the case of utilizing the micro-lens array plate for the optical system, there is another problem in that the micro-lens array plate, especially, increases the irregular distribution of amount of light corresponding to the sensor-output relative to the case of utilizing another lens (e.g. a rod lens array). It is typically difficult to form the micro-lens array plate while keeping a uniformity of the dimensions (in particular, the plate thickness) and an optical performance of micro-lenses (a direction of an optical axis, a lens pitch and a curvature of the lens) on the whole area of the micro-lens array plate in the injection molding process.

SUMMARY OF THE INVENTION

The object of the present invention is to solve the above-described problems. In accordance with the present invention, a method for aligning a light-receiving element array substrate in a short time, a method for manufacturing a contact image sensor, and a contact image sensor comprising components which have a suitable structure to facilitate the alignment of the light-receiving element array substrate are provided. The components include a plurality of micro-lens array plates, a slit plate and at least one light-receiving element array mounted on the substrate.

A first aspect of the present invention is a method for aligning a light-receiving element array substrate provided in a contact image sensor. In accordance with this method, the light-receiving element array substrate is aligned in a sub-scanning direction so that sensor-output detected through at least one light-receiving element array becomes a maximum while light reflected from a reference original of uniform lightness distribution is received by the at least one light-receiving element array mounted on the light-receiving element array substrate, the sub-scanning direction being perpendicular to the main-scanning direction. The reference original used to align the light-receiving element array substrate in accordance with the present invention has uniform lightness distribution. An original of high reflectivity with which sensor-output becomes large is preferably used for such a reference original to facilitate aligning the light-receiving element array substrate. A reference original with uniform lightness distribution may be an original with a chromatic color or an achromatic color (white or gray).

In addition, a second aspect of the present invention is another method for aligning a light-receiving element array substrate provided in a contact image sensor. In accordance with this method, the light-receiving element array substrate is aligned in a sub-scanning direction, so as to incline an array-line of at least one light-receiving element array with respect to a centerline of a slit opening to reduce the difference of distribution in a main-scanning direction of sensor-output while light reflected from a reference original of uniform lightness distribution is received by the at least one light-receiving element array mounted on the light-receiving element array substrate.

In addition, a third aspect of the present invention is a method for manufacturing a contact image sensor further comprising a step of fixing the light-receiving element array substrate, which is aligned by the steps of the first and/or second aspect of the present invention, into the housing provided in the contact image sensor.

Moreover, a fourth aspect of the present invention is a contact image sensor that enables scanning a surface of an original to read the image of the original. This contact image sensor comprises a housing, one or two light sources for irradiating light onto a original being fixed into the housing, and a slit plate including a slit opening for passing light reflected from the original. The slit plate is fixed into the housing and the slit opening has an elongated-shape extended in a main-scanning direction. The contact image sensor further includes a lens for forming an erecting unit magnification image by focusing the reflected light from the original through the slit opening of the slit plate, the lens being composed of a plurality of micro-lens array plates. The light-receiving element array substrate includes at least one light-receiving element array. The light-receiving element array substrate is supported in the housing such that the light-receiving element array substrate is aligned in a sub-scanning direction perpendicular to the main-scanning direction.

In accordance with the present invention, an online alignment for aligning the optical system of the contact image sensor is provided, wherein the online alignment is implemented while monitoring an electric signal such as a sensor-output of the contact image sensor.

Moreover, a gap (allowance) is provided between the light-receiving element array substrate and the housing to enable the alignment of the substrate. Because the light-receiving element array substrate is supported in the housing while keeping the gap in which each of the light source, the slit plate and the lens other than the substrate is, fixed into the housing, the substrate may be aligned while monitoring the electric signal. Thus, a method is provided for aligning a light-receiving element array substrate in a short time, because only the substrate may be aligned.

Particularly, in accordance with the present invention, it becomes easy to implement the online alignment because the shape of the light-receiving element array substrate is formed so as to facilitate the application of power to the light source.

More particularly, in accordance with the present invention, there is provided a contact image sensor having a large sensor-output that corresponds to large amount of light without substantially increasing electrical current of the light-emitting element array, because an irregular amount of light caused by the light source and/or the lens may be suppressed.

BRIEF DESCRIPTION OF THE DRAWINGS

Although the invention is illustrated and described herein with reference to specific embodiments, the invention is not intended to be limited to the details shown. Rather, various modifications may be made in the details within the scope and range of equivalents of the claims and without departing from the invention.

FIG. 6 is an example illustration of an image generated using a contact image sensor according to an embodiment of the present invention showing ghost images.

DESCRIPTION OF THE PREFERRED EMBODIMENTS

A first embodiment of a contact image sensor in accordance with the present invention will now be described.

A First Embodiment

Figure 1A:
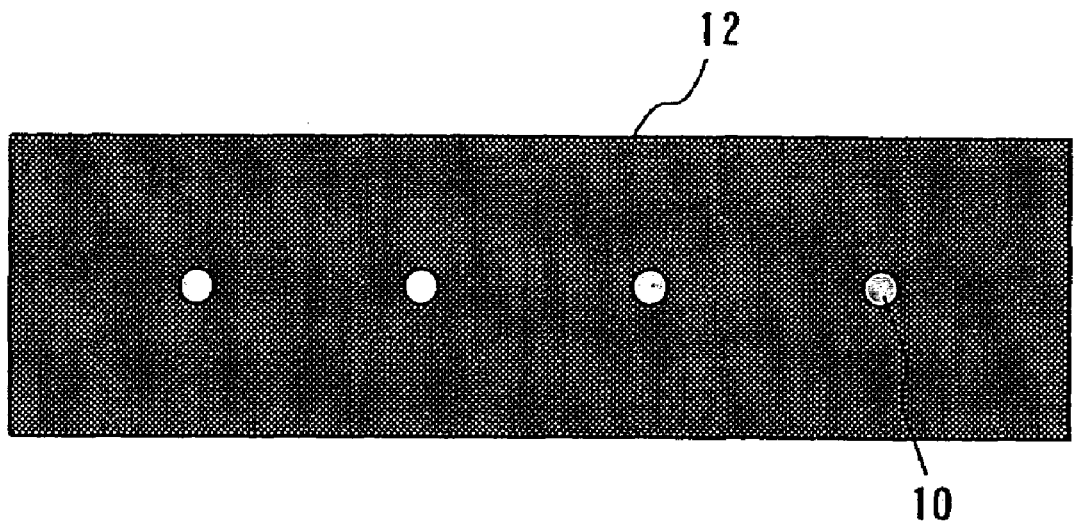
FIG. 1A is a plan view of a conventional test chart read with a contact image sensor.
Figure 1B:
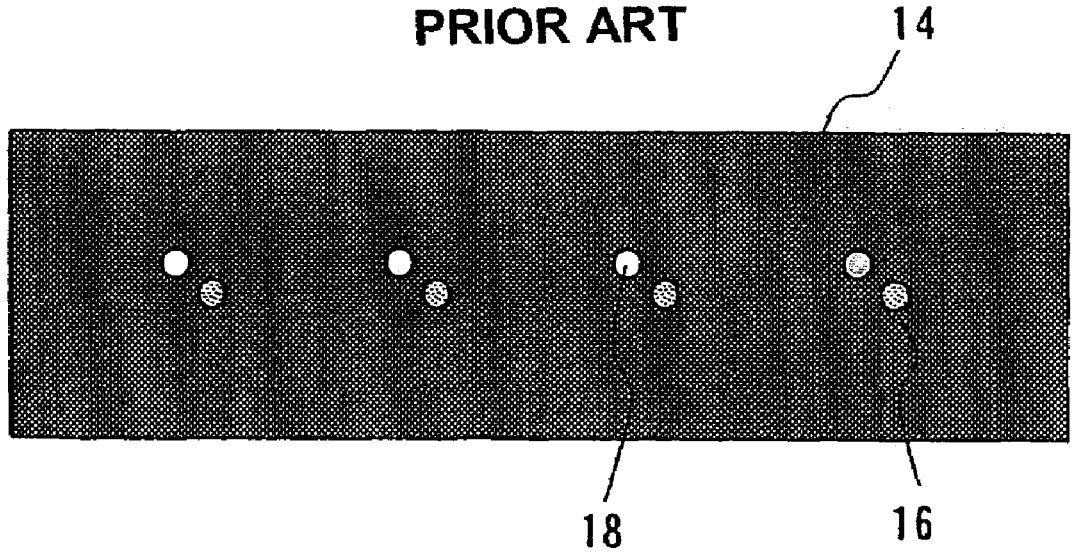
FIG. 1B is an example illustration corresponding to an image of the conventional test chart, shown in FIG. 1A, read with the contact image sensor.
Figure 2:
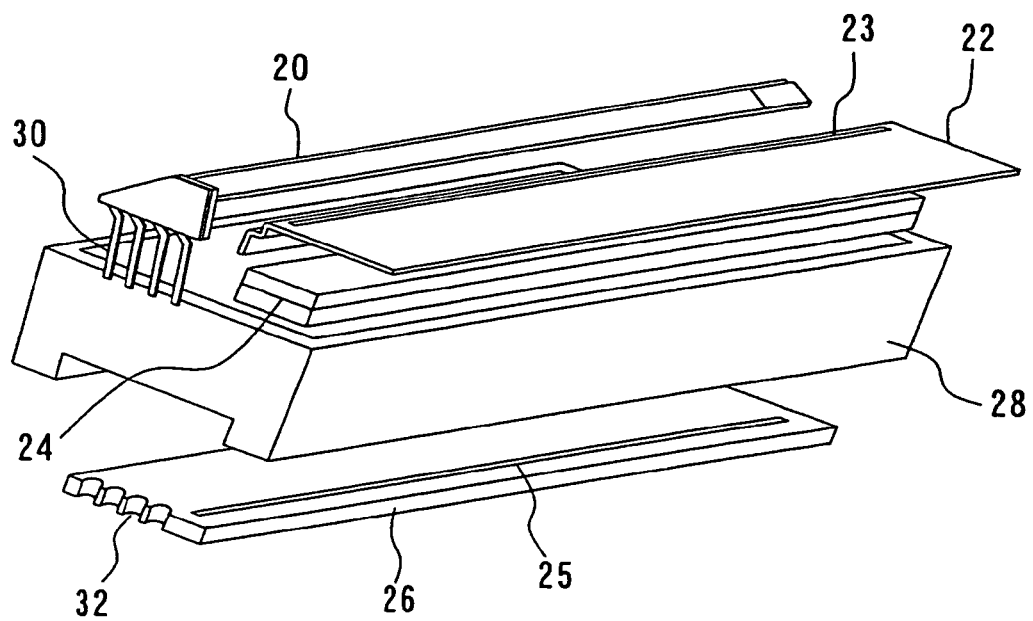
FIG. 2 is an exploded perspective view of a contact image sensor in accordance with the present invention.

FIG. 2 is an exploded perspective view of a contact image sensor in accordance with the present invention. This contact image sensor comprises a light source 20, a slit plate 22, an erecting unit magnification lens 24 including stacked two micro-lens array plates 24a and 24b (FIG. 3), a light-receiving element array substrate 26 on which a light-receiving array 25 is mounted and a housing 28 for containing these components.

The light source 20 is composed of a linear illuminating device, such as one type of device in which the light-emitting element array is linearly located in a main-scanning direction and another type of device in which one or more of the light-emitting elements is located on one or both ends of a linear light-guide in the line illuminating device.

In this embodiment, an exemplary light source may include one or more of light-emitting elements. In an exemplary embodiment, the light source contains three light-emitting diodes (LEDs) of red (R) color, green (G) color and blue (B) color, which is mounted on one end of a linear light-guide. In this case, four or five leads for applying power to the light source are needed for the LEDs. In FIG. 2, each of four leads 30 to apply the power is mounted on end of the light source 20. It should be noted that another light source may be used which has a structure bonded directly without utilizing the leads in the light-receiving element array substrate.

Figure 3:
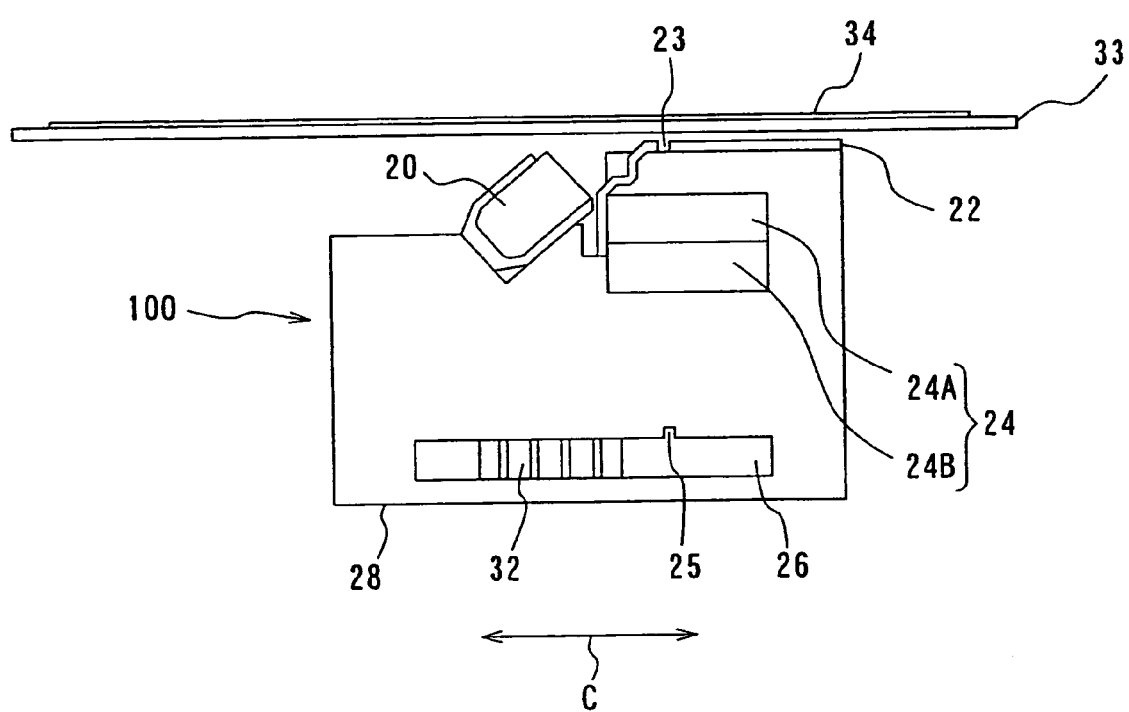
FIG. 3 is a sectional view of a contact image sensor illustrating a light source, a slit plate, a lens, and a light-receiving element array substrate in a housing.

In this embodiment, a slit opening 23 that has an elongated-shape is arranged in a slit plate 22. These components, such as the light source 20, the slit 22, and the lens 24, are contained in the housing 28 and fixed into the housing 28 as shown in FIG. 3. In FIG. 3, the leads 30 arranged on end of the light source 20 are omitted for simplicity. In FIG. 3, an original 34 is set on an original glass plate 33.

The housing 28 for containing the light-receiving element array substrate 26 is also designed so that a structural distance between the housing and the substrate has a gap (allowance) to maintain enough space to align a positioning relationship among the lens 24, the slit plate 22 and the light-receiving element array 25. The width of the gap is designed to enable such alignment in a range of at least ±0.1 mm or more in a sub-scanning direction, the sub-scanning direction being perpendicular to the main-scanning direction. After the position of the substrate 26 is aligned in the sub-scanning direction (direction indicated by an arrow C as shown in FIG. 3) as described below, the substrate 26 may be fixed into the housing 28. To fix the substrate 26 into the housing 28, for example, adhesive may be utilized.

Figure 4A:
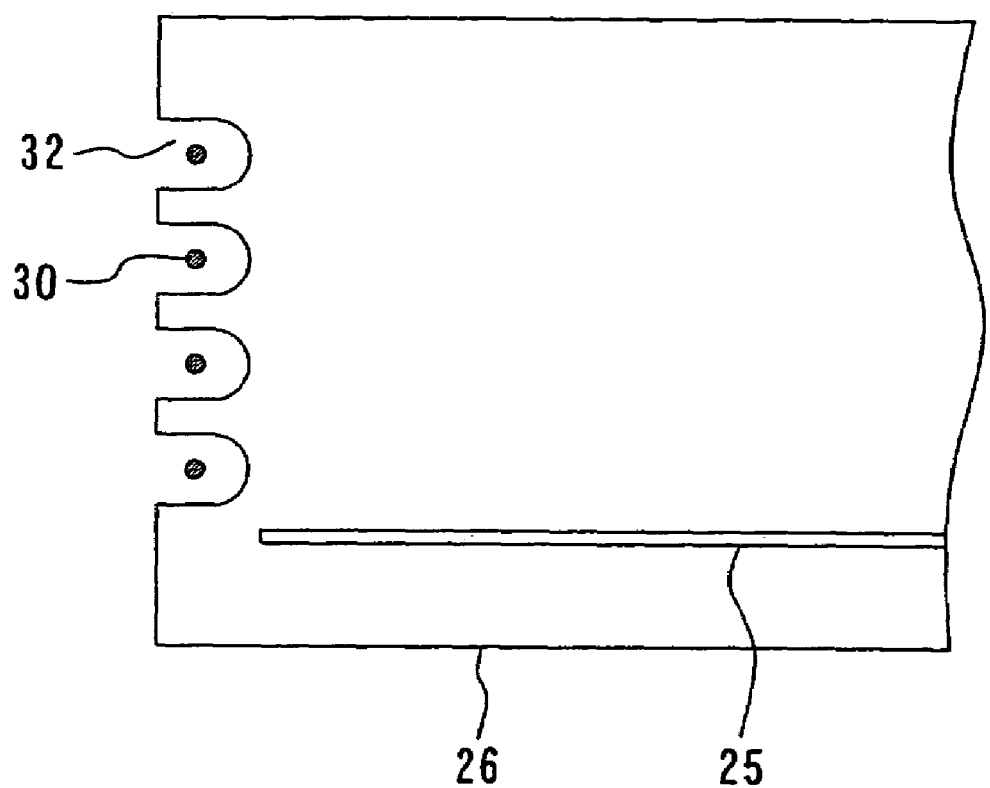
FIG. 4A is a plan view showing a shape of one end of a light-receiving element array substrate.

In this case, four U-shaped depressions 32 are formed on end of the light-receiving element array substrate 26 so that each of leads 30 passes through each of depressions 32 as shown in FIG. 4A. Each of these depressions 32 has a large enough width for the thickness of each of leads 30. The shape of each of depressions 32 is not limited to U-shaped. For example, the depression may be rectangular-shaped. Moreover, the shape of each of depressions 32 may be slot-shaped with respect to the direction for aligning the substrate, i.e. the sub-scanning direction, instead of a U-shaped depression.

Figure 4B:
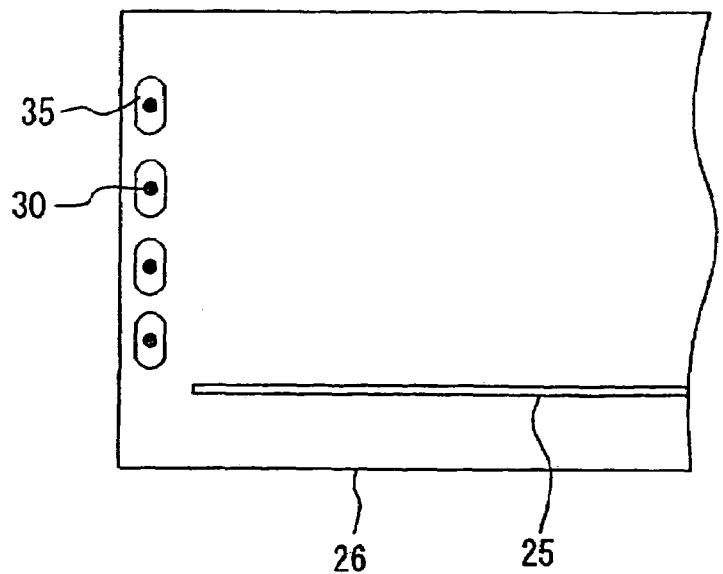
FIG. 4B is a plan view showing another shape of one end of a light-receiving element array substrate.

For example, as shown in FIG. 4B, four slot-shaped holes 35 may be formed in the substrate 26 instead of the four depressions 32 so that each of the holes 35 is large enough such that to each of leads 30 may be passed through holes 35.

Figure 4C:
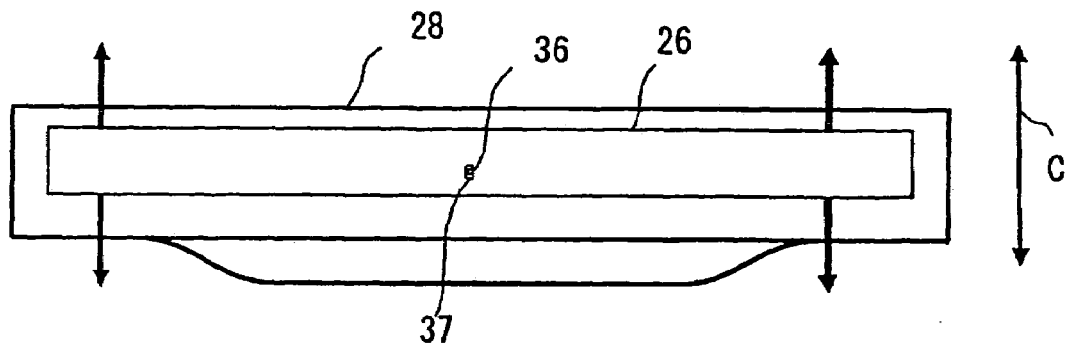
FIG. 4C is plan view of a light-receiving element array substrate that has a slot-like hole in a center portion.
Figure 4D:
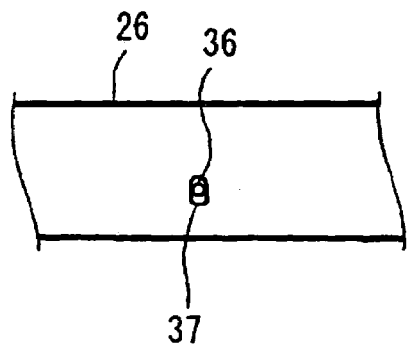
FIG. 4D is an enlarged plan view of the light-receiving element array substrate shown in FIG. 4C.

In addition, as shown in FIG. 4C, a hole 37 may be formed in central portion of the substrate 26 such that a projection 36, formed on the bottom surface of the housing, fits into the hole 37 which has a suitable slot-shape, as shown in FIG. 4C. FIG. 4D is an enlarged plan view of the light-receiving element array substrate 26 shown in FIG. 4C.

In FIG. 3, light irradiated by means of the light source 20 is reflected from the original 34, and the reflected light enters into the lens 24 through the slit opening 23 in the slit plate 22. The light focused through the lens 24 enters into the light-receiving element array 25.

In the contact image sensor described above, the array direction of micro-lenses in each of the two micro-lens array plates 24A and 24B stacked on each other is inclined with respect to the main-scanning direction. Thereby ghost images generated in the array direction of the micro-lens portions may be removed by means of the slit plate 22 in a region other than the slit opening 23.

Figure 5A:
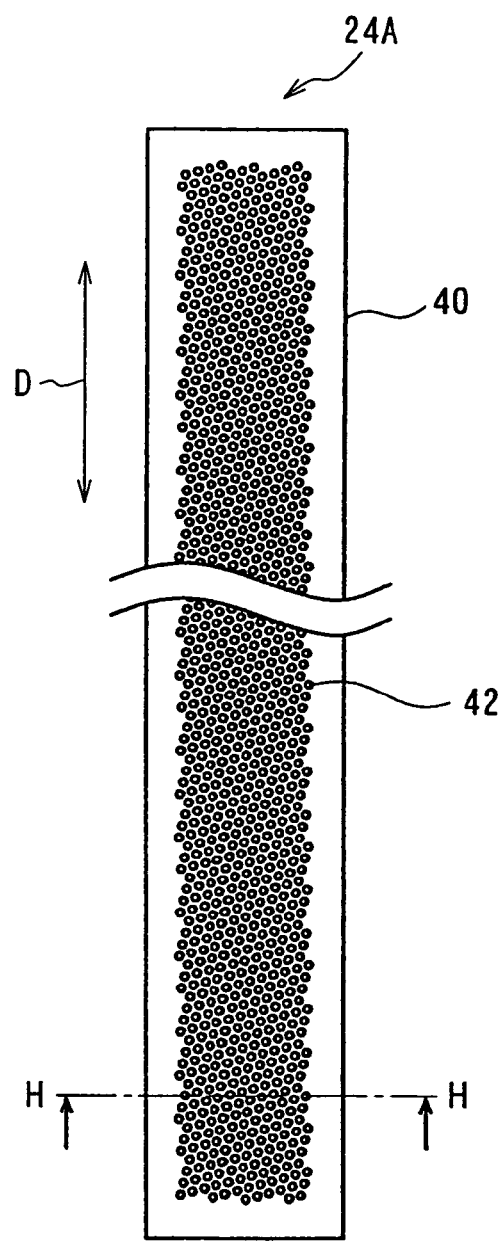
FIG. 5A is a plan view of a micro-lens array plate.
Figure 5B:
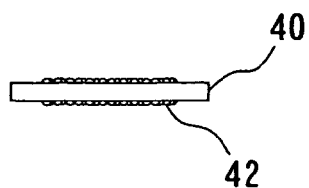
FIG. 5B is a cross-sectional view of a micro-lens array plate.

FIG. 5A is a plan view of the micro-lens array plate 24A, and FIG. 5B is a cross-sectional view taken on line H-H shown in FIG. 5A. In the micro-lens array plate 24A, the micro-lenses (minute convex lens 42) are formed on both sides of a lens plate 40 of the micro-lens array plate 24A.

The micro-lenses 42 are arranged in a hexagonal arrangement, which has a direction inclined by angle 15° with respect to the main-scanning direction (direction indicated by an arrow D shown in FIG. 5A).

The micro-lenses 42 of the micro-lens array plate 24B are also arranged in a hexagonal arrangement, in a similar manner as for the micro-lens array plate 24A. The lens 24 is composed of stacked two micro-lens array plates 24A and 24B and functions as an erecting unit magnification lens. Such lens 24, however may cause ghost images along the array direction of the micro-lenses.

A representative image is illustrated in FIG. 6, including ghost images 16 and actual images 18. It is understood that ghost images 16 don't exist in the main-scanning direction (direction indicated by an arrow D), whereas the actual image 18 exist in the main-scanning direction.

Thus, the alignment of the light-receiving element array substrate 26 may prevent the light-receiving element array 25 from receiving light corresponding to ghost images in the main-scanning direction by aligning the position of the substrate 26 which includes the light-receiving element array 25, in the sub-scanning direction. To establish such a suitable position of the substrate 26, the position of the substrate 26 is aligned in the sub-scanning direction so as to obtain a maximum of sensor-output of the contact image sensor while reading an image of a reference original of uniform lightness distribution, for example, a white color original.

In order to facilitate aligning the light-receiving element array substrate 26 in the sub-scanning direction, the depressions 32 are formed on one end of the substrate 26 as described above having a large enough width to make the leads 30 of the light source 20 pass through such that each of leads 30 does not disturb the alignment of the substrate 26 in the sub-scanning direction. Moreover, this structure of the substrate 26 facilitates applying power to the light source 20 through the leads 30 while the substrate 26 is being aligned.

Figure 7:
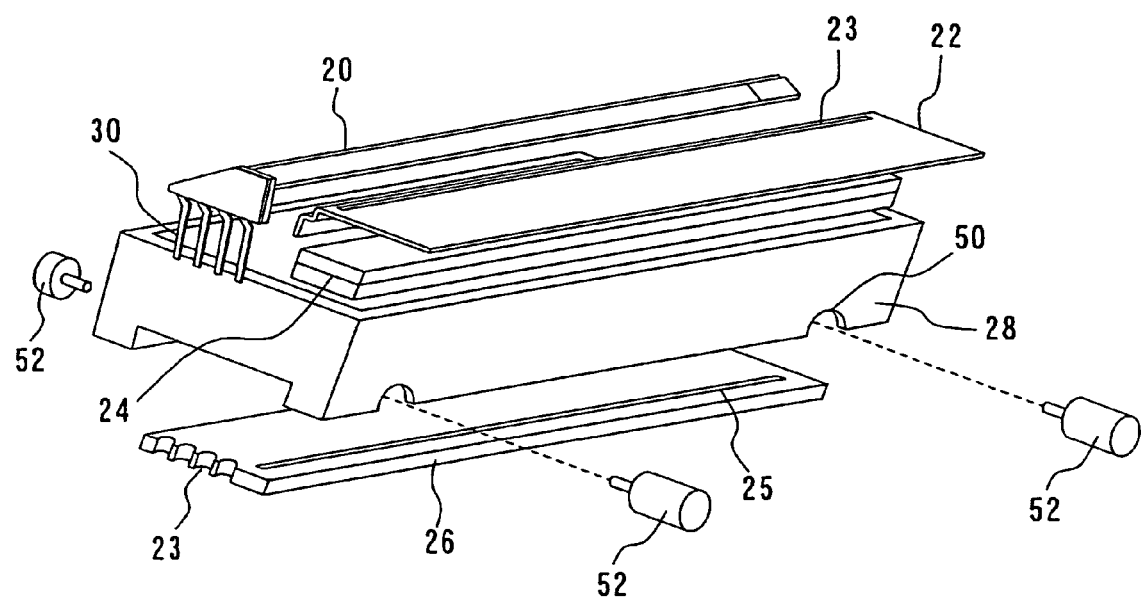
FIG. 7 is an exploded perspective view showing one embodiment of an alignment state.

In the alignment of the light-receiving element array substrate 26 in a sub-scanning direction, one or more adjustment components may be utilized. One exemplary method for aligning the substrate is shown in FIG. 7, for example, utilizing pins 52 as the adjustment components. Holes 50 are formed in both sides of the housing 28, respectively, as shown in FIG. 7, and each of the pins 52 for alignment is inserted through each of the holes 50, and moves the light-receiving element array substrate 26. This structure of the substrate 26 make fine-tuning easy because the substrate 26 is moved by means of operating the pins 52 back and forth for alignment. Four pins 52 are preferably arranged on both sides of the housing 28 with at least two pins being arranged on each side.

In another example, six pins in both sides of the housing 28 may be used (not shown) with at least three pins being arranged on each side for alignment, instead of the four pins 52. Even if the light-receiving element array substrate 26 has any distortion, the distortion may be corrected by adjusting each force that is applied by the six pins for the alignment.

It is contemplated that the adjustment components for alignment, for example, may utilize screws or springs instead of pins. For example, in FIG. 7, if the pins on one side of the substrate are replaced by screws or springs, the fine-tuning of alignment may become easy.

Figure 8:
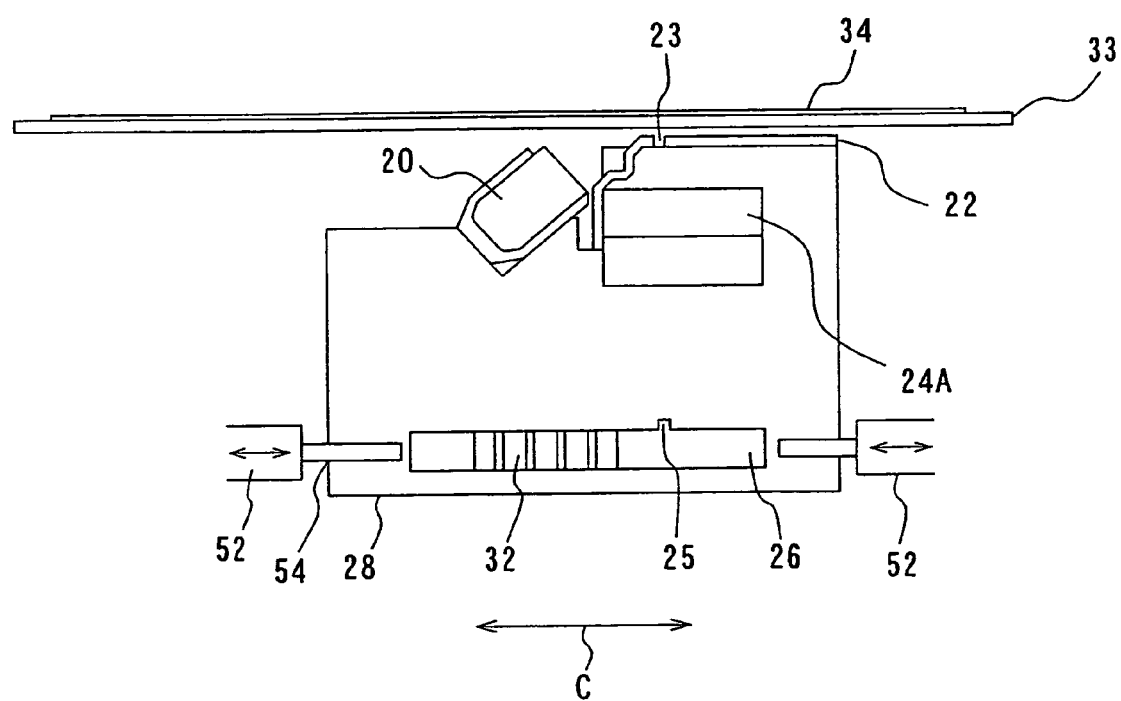
FIG. 8 is a sectional view showing another embodiment of an alignment state.

While the holes 50 are arranged in order to insert the pins 52 for alignment, as shown in FIG. 7, one and more holes 54 may be arranged within the housing 28 as shown in FIG. 8.

It is preferable for the contact image sensor to irradiate the original 34 by means of light having a uniform brightness.

A uniform brightness may be obtained, for example, by applying an optical diffusion plate over the light-emitting surface of a linear illuminating device.

Figure 9:
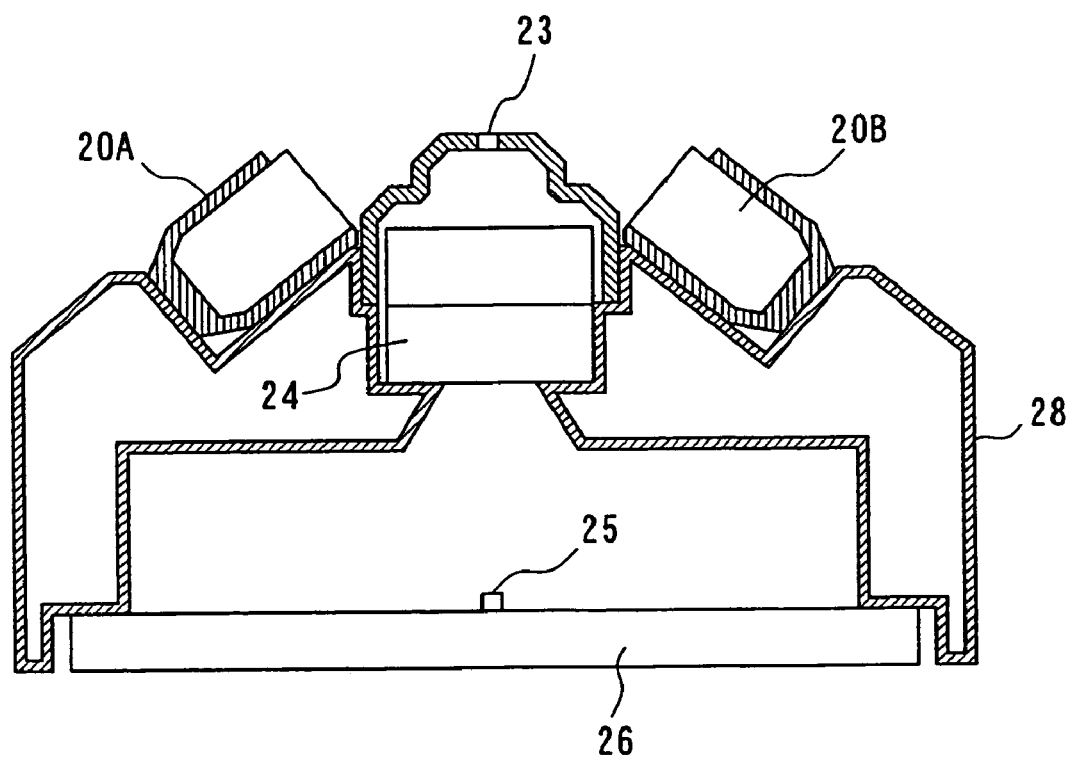
FIG. 9 is a sectional view of a contact image sensor illustrating two light sources in a housing in accordance with one embodiment of the present invention.

Moreover, in a linear illuminating device that includes one or more light-emitting elements (e.g. LEDs) on one end of the linear light-guide, a pair of the linear illuminating devices may be preferably utilized for a contact image sensor. A contact image sensor comprising two linear illuminating devices 20A and 20B is shown in FIG. 9. Each of the light-guides in the linear illuminating devices 20A and 20B includes the light-emitting elements arranged on one end of each of the light-guides. Each of the light-emitting elements are alternately located on a mutual end of each of the linear illuminating devices with respect to the main-scanning direction. In this manner, a more uniform luminance distribution may be obtained by utilizing a pair of the linear illuminating devices, because each of the linear illuminating devices 20A and 20B has a similar luminance distribution. According to an exemplary embodiment, each of the light-emitting elements are disposed on opposite ends of the light source with respect to the main-scanning direction and the light source is composed of the two linear illuminating devices, as described above.

In addition, a further uniform luminance distribution in the main-scanning direction may be obtained with a linear illuminating device that includes one or more light-emitting elements in both ends of a linear light-guide.

A second embodiment of the contact image sensor in accordance with the present invention is now described.

A Second Embodiment

A second embodiment, includes a method for aligning a light-receiving element array substrate 26 provided in a contact image sensor. The method may be implemented by the same structure as the contact image sensor shown in the above-described FIG. 7, thus a description of the structure is omitted with regard to similar components or elements. Normally, light irradiated by means of a light source generates an irregular distribution of the amount of light in a main-scanning direction. Therefore, the method includes the step of receiving light reflected from a reference original of uniform lightness distribution (for example, a white color original) by means of the light source to detect sensor-output through a light-receiving element array. The method further includes the step of aligning the light-receiving array substrate 26 in the sub-scanning direction such that an array-line of a light-receiving array 25 mounted on the substrate 26 is inclined with respect to a centerline of a slit opening in a slit plate in order to reduce the difference of distribution in the main-scanning direction of the sensor-output. As a method for manufacturing the contact image sensor, the method further comprises a step of fixing the aligned substrate 26 into the housing 28, using the above method for aligning the substrate. In this manner, there is provided the contact image sensor in the second embodiment.

Figure 10:
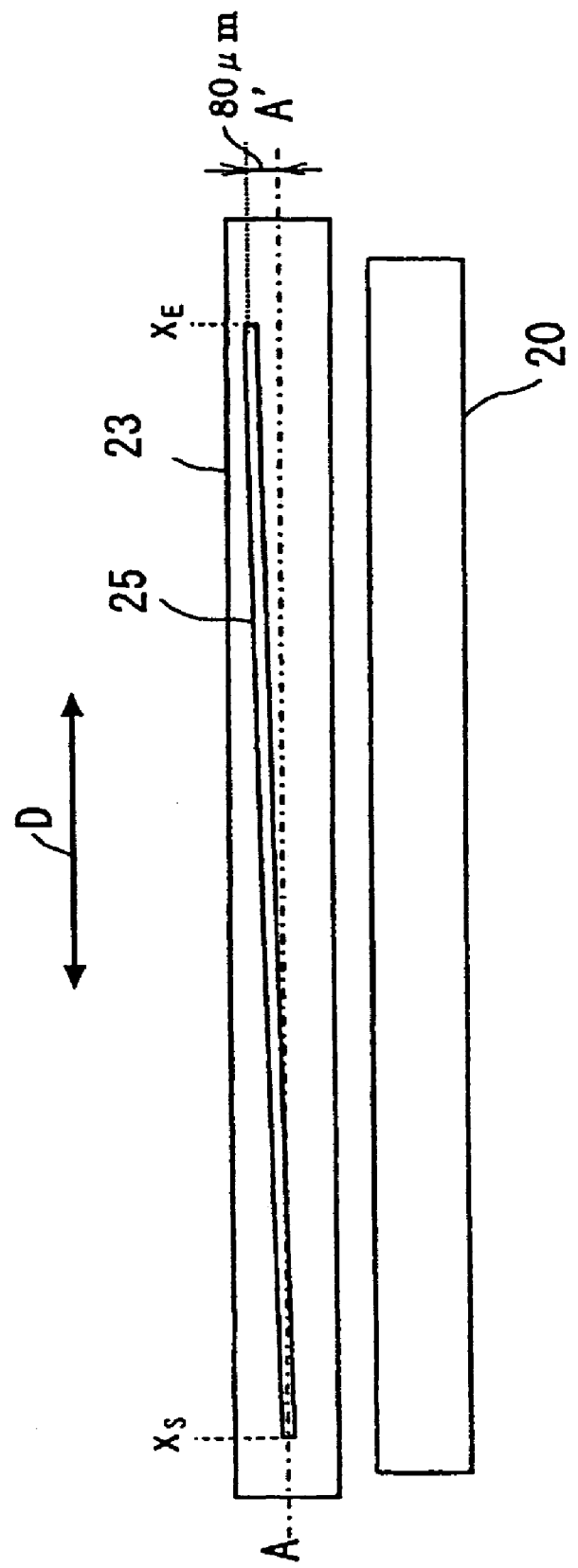
FIG. 10 is a plan view of a contact image sensor that positions a light-receiving element array away from a centerline of a slit opening in a slit plate by 80 μm, where an array-line of the light-receiving element array is inclined with respect to the centerline, in accordance with a second embodiment of the present invention.

In this embodiment, a linear illuminating device which comprises a translucent linear light-guide and a light-emitting diode light source unit (hereinafter, the LED light source unit) is used for a light source 20. The light source 20 may include a monochromatic light source, three kinds of colors R, G and B, or any combination thereof. The LED light source unit is arranged on one end of the translucent linear light-guide. FIG. 10 is a plan view of a contact image sensor illustrating the positioning of the array-line of the light-receiving element array 25 away from a centerline A-A' of a slit opening 23 in a slit plate 22 by 80 μm or less in accordance with the second embodiment. The array-line of the light-receiving element array 25 is located away from the centerline A-A' in order to keep away an area of a large amount of light reflected from the reference original (for example, the area of a large amount of light is an area further from the LED light source unit in the main-scanning direction).

In a more detail description of the light source 20 used in the second embodiment, the light source 20 may not have a uniform distribution in the main scanning direction, with an amount of light in an area adjacent to the LED light source unit becoming small and with an amount of light in an area further from the LED light source unit becoming large. In this embodiment, an optical pattern for reflection or diffusion of a translucent linear light-guide is designed in one or more surfaces other than an irradiation surface (not shown in FIG. 10). The reflection/diffusion pattern is normally designed with a white color printing or a structure of concavity and/or convexity shape. In an area further from the LED light source unit in the main-scanning direction, an amount of light will be larger, because light that is irradiated by means of the LED light source unit is irradiated from the irradiation surface of the linear light-guide light, resulting in iterative reflection/diffusion of light in the translucent linear light-guide. Although a light source 20 is described above as having a nonuniform distribution, it is understood that a light source 20 is not limited to this distribution.

In accordance with the second embodiment, one area of the light-receiving array 25, where an amount of light irradiated by means of the light source 20 is small, is located substantially on a centerline A-A' of the slit opening 23. Another area (for example, an area that is further from the LED light source unit), where an amount of light irradiated by means of the light source 20 is large, is located away from the centerline A-A' of the slit opening 23 in a predefined range. The predefined range is $0 \leq y \leq 150$ μm. The distance in the main-scanning direction (direction indicated by an arrow D) is x (including a starting position $x_S$ and an ending position $X_E$), the distance in the sub-scanning direction (direction indicated by an arrow C) with respect to the centerline A-A' of the slit opening 23 is y, where the distance y on the centerline A-A' becomes y=0. In FIG. 10, although it is shown that the distance y in the starting position $x_S$ of the light-emitting element array 25 is y=0 and the distance y in the ending position $x_E$ thereof is y=80 μm it is understood the present invention is not limited thereto.

According to the method for aligning the substrate 26, a characteristic is utilized that an amount of light received by means of the light-receiving element array becomes larger substantially in a centerline of the slit opening 23. Moreover, if the distance y between the centerline A-A' of the slit opening 23 and the light receiving array 25 becomes too long, ghost images may be easily generated. In particular, if the distance y exceeds 150 μm, the ghost images will be more easily generated. In addition, in this case, the amount of light received by means of the light-receiving element array 25 will be decreased on the basis of increasing of the distance y. Therefore, an amount of light irradiated by means of the light source 20 may be increased so that amount of light may be more than a predetermined amount needed for focusing. In particular, it may be undesirable for the distance y to exceed 150 μm, because an electrical current applied to the light source 20 should be much larger in order to generate sufficient irradiation thereof.

Figure 11:
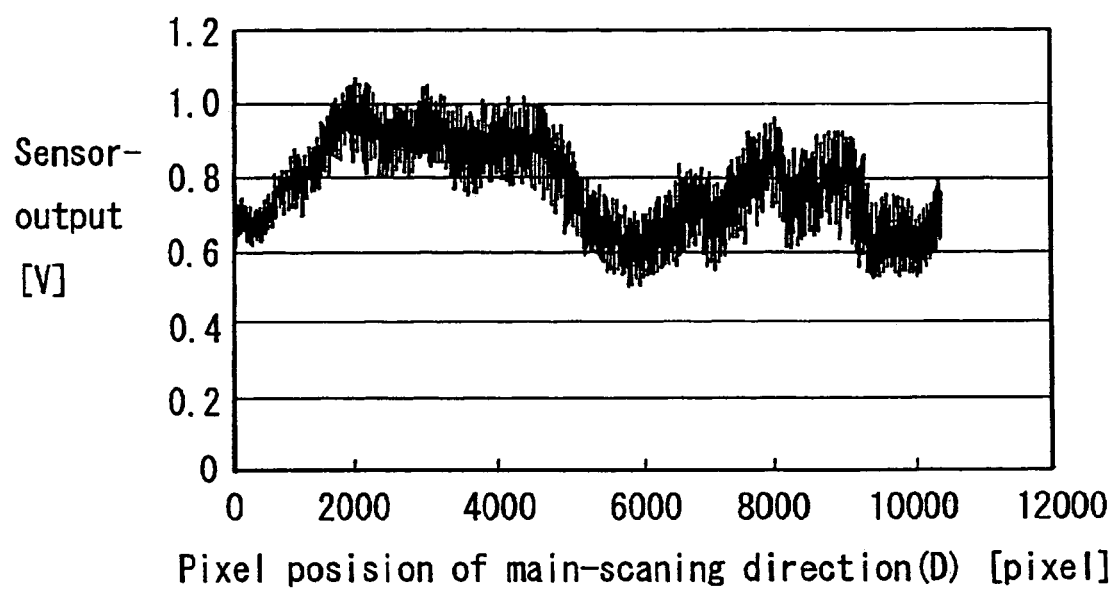
FIG. 11 is an example illustration showing a measurement result of sensor-output obtained from a light-receiving element array by receiving light reflected from a reference original of uniform lightness distribution where the reference original is irradiated by means of a light source, in the contact image sensor shown in FIG. 10.

FIG. 11 is an example illustration showing a measurement result of sensor-output obtained by receiving light reflected from a reference original of uniform lightness distribution by means of the light-receiving element array where the reference original is irradiated by means of a light source, in accordance with the second embodiment of the present invention.

To indicate irregular distribution of amount of light, an equation PRNU is used:

$PRNU$=(max. output+min. output)/(max. output−min. output)×100 (%);

where max. output is a maximum of the sensor-output, and min. output is a minimum of the sensor-output.

According to the second embodiment, the PRNU was 36%, and the irregular distribution of amount of light was reduced. In this case, the electrical current of the LED light source unit was set to be 10.8 mA. If the aligned position of the light-receiving element array 25 is located further from the centerline A-A' of the slit opening 23, an amount of light received by means of the light-receiving element array 25 will be small. Therefore, the electrical current of the LED light source unit may be increased to be substantially equal to a maximum value of sensor-output in which the array-line of the light-receiving element array 25 is located on the centerline A-A' of the slit opening 23. When the light-receiving element array 25 was located on the centerline A-A' of the slit opening 23, the electrical current of the LED light source unit was 10 mA. Therefore, the degree for increasing electrical current of the LED light source unit in the second embodiment is relatively small, 10% or less. In addition, ghost images were not generated by this measurement.

A first comparative example with respect to the contact image sensor of the second embodiment is now described.

A First Comparative Example

Figure 12:
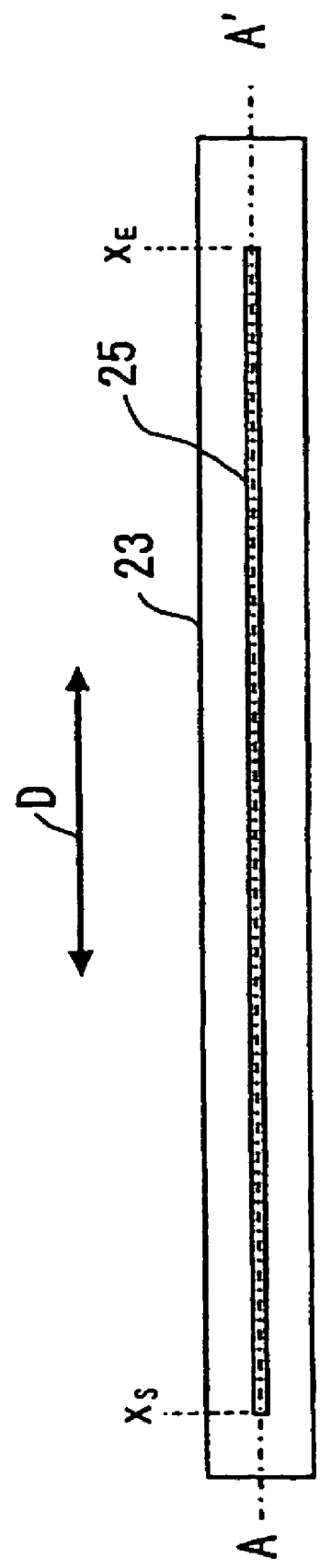
FIG. 12 is a plan view of a contact image sensor illustrating positioning a light-receiving element array on a substantially centerline of a slit opening in a slit plate.
Figure 13:
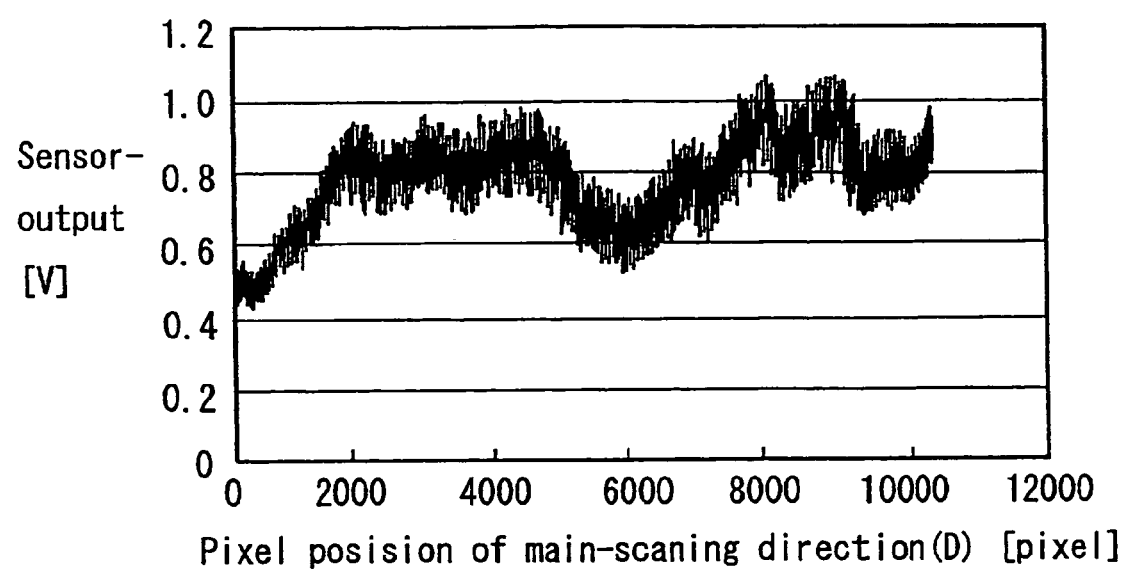
FIG. 13 is an example illustration showing a measurement result of sensor-output obtained from a light-receiving element array by receiving light reflected from a reference original of uniform lightness distribution where the reference original is irradiated by means of a light source, in the contact image sensor shown in FIG. 12.

FIG. 12 is a comparative example of a contact image sensor showing the state of aligning the light-receiving array substrate 26 such that the light-receiving element array 25 is located on a substantially centerline of the slit opening 23 in the slit plate. A measurement result of a sensor-output for this state is shown in FIG. 13. The sensor-output is obtained by receiving light reflected from a reference original of uniform lightness distribution by means of the light-receiving element array 25 where the reflected light from the reference original is generated by means of the light source 20.

In FIG. 13, on the basis of the distribution of amount of light in the main-scanning direction of the light source 20, it is noted that the sensor-output is large in a region adjacent to the starting position $x_S$ of the light-receiving element array 25 in the main-scanning direction, and the sensor-output is small in the region further from the starting position $x_S$ of the light-receiving element array 25 in the main-scanning direction. In this case, the PRNU indicated that the irregular amount of light was 45%. The electrical current of the LED light source unit was 10 mA. In addition, ghost images were not generated. Referring to the first comparative example, it is noted that it is more effective to incline the array-line of the light-receiving element array 25 mounted on the substrate 26 with respect to the centerline A-A' of the slit opening 23, as described above in the second embodiment.

A second comparative example with respect to the contact image sensor of the second embodiment is now described.

A Second Comparative Example

In the second comparative example, the distance y in a sub-scanning direction at the ending position $x_E$ of the light-receiving element array 25 was set larger, for example more than 150 µm, with respect to the alignment of the contact image sensor shown in FIG. 10. In this case, ghost images were generated. In addition, the ghost images were generated at the distance y exceeding 150 µm in the sub-scanning direction. The sensor-output was observed while moving the light receiving element array 25 at position $x_E$ distance y in the range from 145 µm to 155 µm. Moreover, the electrical current of the LED light source unit needed to be substantially increased, such as 13.5 mA, in order to obtain a desired maximum of the sensor-output that is substantially equal with the sensor-output corresponding to the light-receiving element array located on the centerline A-A' of the slit opening.

In the second embodiment, as described above, the irregular amount of light irradiated by means of the light source 20 is a characteristic used for the alignment of the substrate 26. In another aspect, the characteristic may be an irregular amount of light generated when a slit opening 23 has an irregular distribution of opening widths in the main-scanning direction. Additionally, the characteristic may be an irregular amount of light generated in a positioning relationship between the light source 20 and the slit opening 23. For example, when a slit opening 23 has an irregular distribution of opening widths in the main-scanning direction, some light-receiving elements of the light-receiving element array 25 are located further from the centerline A-A' of the slit opening 23 at some regions where the opening width is large. Other light-receiving elements are located close to the centerline A-A' of the slit opening 23 as much as possible at the other regions of which the opening width is small in the sub-scanning direction. In this manner, a more uniform sensor-output may be obtained.

Figure 14:
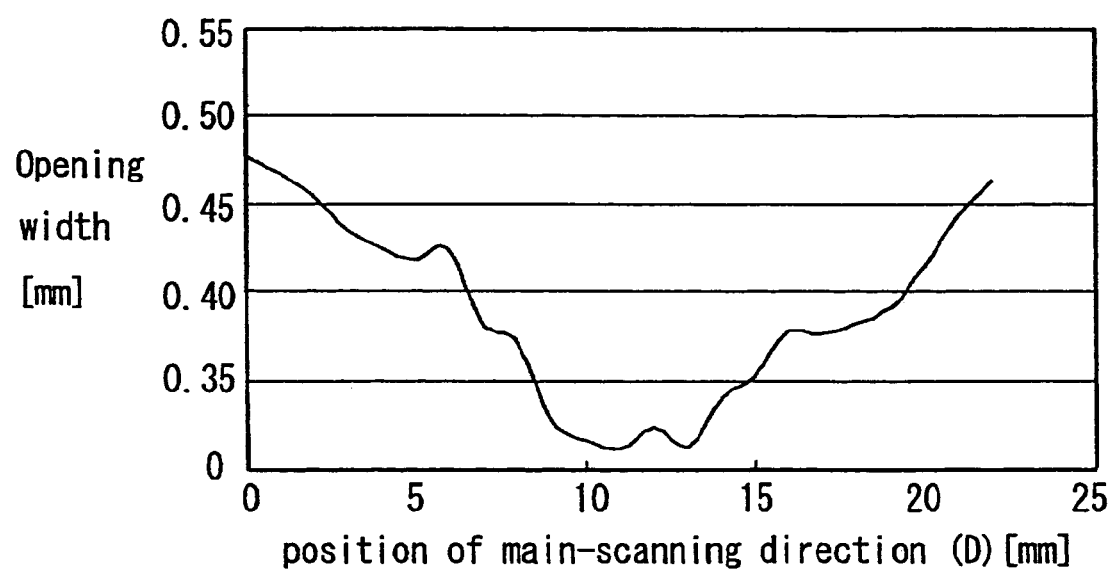
FIG. 14 is an illustration showing a shape of a slit opening in a slit plate that has an irregular opening width in a main-scanning direction, in accordance with another aspect of the contact image sensor in the second embodiment of the present invention.

In another aspect of the second embodiment is shown in FIG. 14, a slit opening 23, provided in the contact image sensor shown in FIG. 10, has irregular opening widths in the main-scanning direction. In this case, the PRNU was substantially 30%. In this aspect, it is indicated that the irregular opening width further facilitate aligning the substrate 26 by having a distribution which reduces the variable amount of light in the sub-scanning direction. In this embodiment, ghost images were not generated.

An embodiment of an image reading apparatus including a contact image sensor in accordance with the present invention is now described.

Image Reading Apparatus

Figure 15:
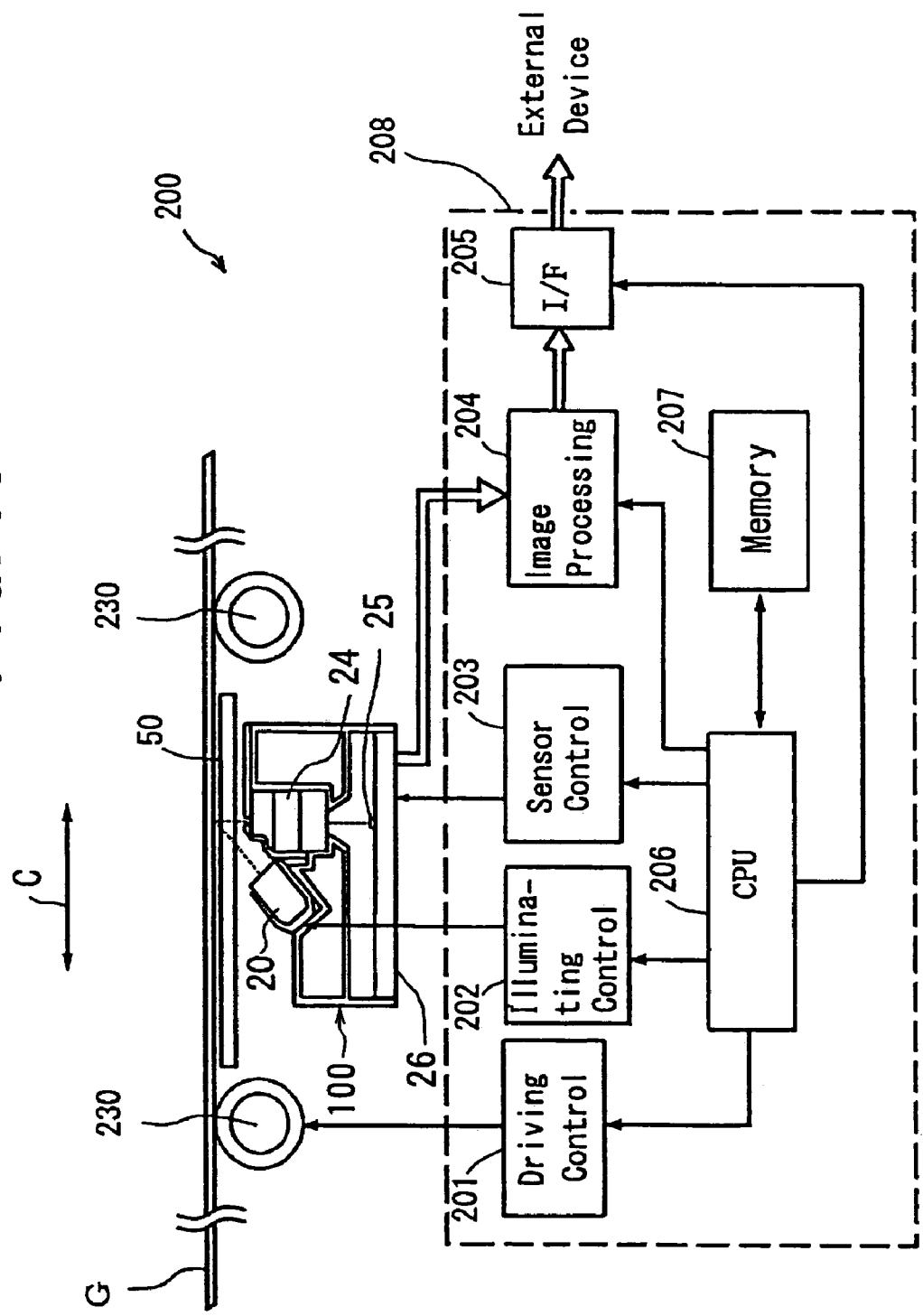
FIG. 15 is a schematic illustration of an image scanner that is an example of an image reading apparatus including a contact image sensor in accordance with the present invention.

FIG. 15 is a schematic illustration of an image reading apparatus including a contact image sensor in accordance with the present invention. An image scanner 200 as an example of an image reading apparatuses includes a light source 20 for irradiating light onto an original G set on an original glass plate, a contact image sensor 100 for reading an image of the original G through light reflected from the original G, a driving device 230 for scanning the original G, and a control circuit 208 for controlling, for example, the light source 20, the contact image sensor 100, and the driving device 230. The contact image sensor 100 includes a light-receiving element array 25 and a lens 24. The light-receiving element array 25 receiving the reflected light from the original G through the lens 24 that is mounted on a light-receiving element array substrate 26 and the lens 24 focusing the reflected light from the original on the light-receiving element array 25.

The control circuit 208 includes a scanning control portion 201 for controlling driving currents or timings of the driving device 230, an illuminating control portion 202 for controlling light-emission of the light source 20 provided in the contact image sensor 100, and a sensor driving control portion 203 for controlling the receiving process of the reflected light from the original G by means of the light-receiving element array 25 mounted on the light-receiving element array substrate 26 provided in the contact image sensor 100 and for controlling a process of photo-electric conversion to obtain sensor-output. The control circuit 208 further includes an image processing portion 204 for processing an image corresponding to the sensor-output obtained by the sensor driving control portion 203, an interface portion 205 for outputting the processed image to an external device, and one or more memories 207 for storing programs used to control the above elements and/or images utilized for the image processing, the interface and the controls. The control circuit also includes a center processing unit (CPU) 206 for controlling the scanning control portion 201, the illuminating control portion 202, the sensor driving control portion 203, the image processing portion 204, the interface portion 205 and the one or more memories 207. Although the sensor-output of the contact image sensor 100 in the second embodiment and/or images thereof may have some inclined positioning information with respect to the main-scanning direction, it is understood that such image information is preferably transmitted to suitable positioning information with functions of the image processing portion 204. It is contemplated that the one or more memories 207 may be used to store at least some of the image information.

In the image reading apparatus shown in FIG. 15, the contact image sensor is fixed into the image reading apparatus to enable reading the image of the original by moving the original G. In another aspect of the image reading apparatus, the contact image sensor may not be fixed and enables reading the image of the original G set on the original glass plate by scanning the original G with the contact image sensor in the sub-scanning (direction indicated by an arrow C).

An embodiment of an image writing apparatus comprising a contact image sensor in accordance with the present invention is now described.

Image Writing Apparatus

Figure 16:
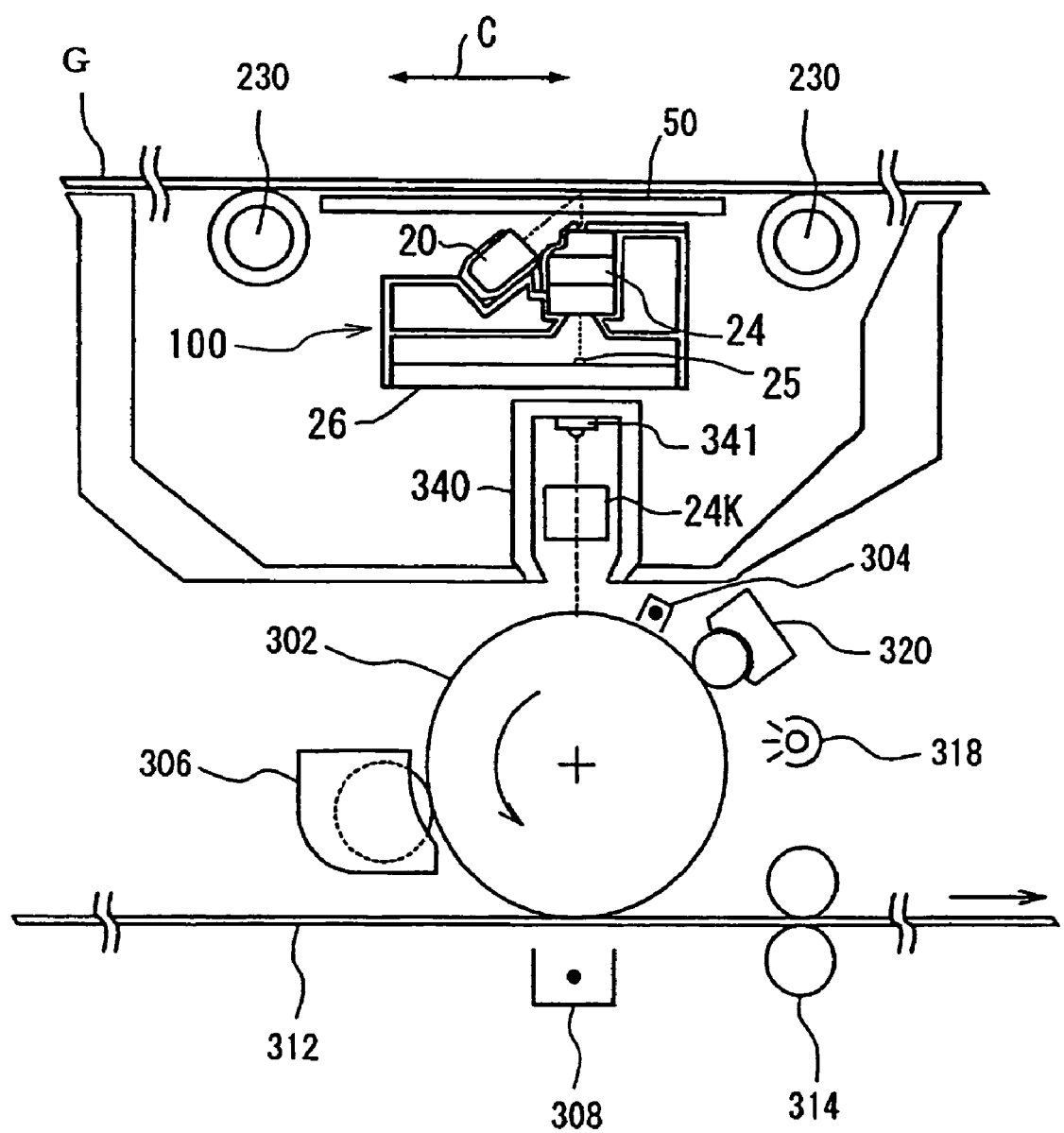
FIG. 16 is a schematic illustration of an electro-photographic apparatus that is an example of an image writing apparatus including a contact image sensor in accordance with the present invention.

FIG. 16 is a schematic illustration of an image writing apparatus including a contact image sensor in accordance with the present invention. In the identical or similar elements shown in FIG. 15, the same reference signs are designated and the description is omitted.

An electro-photographic apparatus of FIG. 16, is an example of an image writing apparatus. Light emitted by means of a light-emitting element array 341 provided in an optical writing head 340 is irradiated based on image information obtained through the contact image sensor 100. Then, light irradiated by means of one or more light-emitting points in the light-emitting element array 341 enters into a lens 24K and is focused on a cylindrical photosensitive drum 302 to form dot images for printing. A light-conductive material (photosensitive body), such as amorphous silicon, is formed on the surface of the cylindrical photosensitive drum 302. This cylindrical photosensitive drum 302 rotates at the printing speed. The whole surface of the cylindrical photosensitive drum 302 is evenly charged by means of a charging device 304 while rotating. Then, in order to form the dot images for printing on the photosensitive body of the cylindrical photosensitive drum 302, light irradiated from the optical writing head 340 reaches the photosensitive body through the lens 24K and charged portions of the photosensitive body are neutralized by means of the light irradiated therefrom. Then, the toner is continuously applied on the photosensitive body with a developing device 306, depending on the state of the charge on the photosensitive body. Then, the toner of the cylindrical photosensitive drum 302 is transferred on a transported paper 312 by a transfer device 308. The transported paper 312 is heated and fixed with an electro-photographic fixing device 314. Finally, the image information in the original G is copied on the transported paper 312. After the transfer is ended, the charged portions of the photosensitive body are neutralized over the entire surface of the cylindrical photosensitive drum 302 by means of an erasing lamp 318, and the remaining toner on the cylindrical photosensitive drum 302 is removed by means of a cleaning device 320.

In FIG. 16, although the image writing apparatus is described as the electro-photographic apparatus, the image writing apparatus may include other devices, for example, a facsimile and a multi-function printer.

In accordance with the present invention, a contact image sensor is provided, which includes elements for reducing ghost images or decreasing the value of the PRNU, to simplify the manufacturing process the manufacture. Providing such a contact image sensor is useful for an image reading apparatus, for example, an image scanner, and for an image writing apparatus, for example as an electro-photographic apparatus, a facsimile and a multi-function printer.

While the present invention has been described and illustrated with reference to specific exemplary embodiments, it should be understood that many modifications and substitutions could be made without departing from the spirit and scope of the invention. Accordingly, the present invention is not to be considered as limited by the foregoing description but is only limited by the scope of the appended claims.

What is claimed is:

1. A method for aligning a light-receiving element array substrate in a contact image sensor which comprises a housing; one or two light sources for irradiating light onto a original, the one or two light sources being fixed into the housing; a slit plate including a slit opening for passing light reflected from the original, the slit plate being fixed into the housing and the slit opening having an elongated-shape extended in a main-scanning direction; a lens for forming an erecting unit magnification image by focusing the reflected light from the original through the slit opening of the slit plate on at least one light-receiving element array, the lens being composed of a plurality of micro-lens array plates; and the light-receiving element array substrate including the at least one light-receiving element array, the light-receiving element array substrate being supported in the housing, the method comprising the steps of:
   (a) setting a reference original of uniform lightness distribution over the slit opening;
   (b) irradiating light onto the reference original by means of the one or two light sources;
   (c) receiving light reflected from the reference original and passed through the slit opening to detect a sensor-output from a photo-electric converted signal by means of the at least one light-receiving element array; and
   (d) aligning the width of the light-receiving element array substrate in a sub-scanning direction perpendicular to the main-scanning direction so as to obtain a maximum of the sensor-output detected in the step (c).

2. The method according to claim 1, wherein the housing includes a plurality of portions such as holes or notches for inserting one or more adjustment components to align the light-receiving element array substrate, and wherein the step (d) further includes the step of aligning in the sub-scanning direction while adjusting the light-receiving element array substrate by the adjustment components.

3. A method for aligning a light-receiving element array substrate in a contact image sensor which comprises a housing; one or two light sources for irradiating light onto a original, the one or two light sources being fixed into the housing; a slit plate including a slit opening for passing light reflected from the original, the slit plate being fixed into the housing and the slit opening having an elongated-shape extended in a main-scanning direction; a lens for forming an erecting unit magnification image by focusing the reflected light from the original through the slit opening of the slit plate on at least one light-receiving element array, the lens being composed of a plurality of micro-lens array plates; and the light-receiving element array substrate including the at least one light-receiving element array, the light-receiving element array substrate being supported in the housing, the method comprising the steps of:
   (a) setting a reference original of uniform lightness distribution over the slit opening;
   (b) irradiating light onto the reference original by means of the one or two light sources;
   (c) receiving light reflected from the reference original and passed through the slit opening to detect a sensor-output from a photo-electric converted signal by means of the at least one light-receiving element array; and
   (d) aligning the width of the light-receiving element array substrate in a sub-scanning direction perpendicular to the main-scanning direction so as to incline an array-line of the at least one light-receiving element array with respect to a centerline of the slit opening to reduce a difference of distribution in the main-scanning direction of the sensor-output detected in the step (c).

4. The method according to claim 3, wherein the housing includes a plurality of portions such as holes or notches for inserting one or more adjustment components to align the light-receiving element array substrate, and wherein the step (d) further includes the step of aligning in the sub-scanning direction while adjusting the light-receiving element array substrate by the adjustment components.

5. A method for manufacturing a contact image sensor which comprises a housing; one or two light sources for irradiating light onto a original, the one or two light sources being fixed into the housing; a slit plate including a slit opening for passing light reflected from the original, the slit plate being fixed into the housing and the slit opening having an elongated-shape extended in a main-scanning direction; a lens for forming an erecting unit magnification image by focusing the reflected light on the original through the slit opening of the slit plate on at least one light-receiving element array, the lens being composed of a plurality of micro-lens array plates; and the light-receiving element array substrate including the at least one light-receiving element array, the light-receiving element array substrate being supported in the housing, the method comprising the steps of:
   (a) setting a reference original of uniform lightness distribution over the slit opening;

(b) irradiating light onto the reference original by means of the one or two light sources;

(c) receiving light reflected from the reference original and passed through the slit opening to detect a sensor-output from a photo-electric converted signal by means of the at least one light-receiving element array;

(d) aligning the width of the light-receiving element array substrate in a sub-scanning direction perpendicular to the main-scanning direction so as to obtain a maximum of the sensor-output detected in the step (c); and (e) fixing the light-receiving element array substrate aligned in the step (d) into the housing.

6. The method according to claim 5, wherein the housing includes a plurality of portions such as holes or notches for inserting one or more adjustment components to align the light-receiving element array substrate, and wherein the step (d) further includes the step of aligning in the sub-scanning direction while adjusting the light-receiving element array substrate by the adjustment components.

7. A method for manufacturing a contact image sensor which comprises a housing; one or two light sources for irradiating light onto a original, the one or two light sources being fixed into the housing; a slit plate including a slit opening for passing light reflected from the original, the slit plate being fixed into the housing and the slit opening having an elongated-shape extended in a main-scanning direction; a lens for forming an erecting unit magnification image by focusing the reflected light from the original through the slit opening of the slit plate on at least one light-receiving element array, the lens being composed of a plurality of micro-lens array plates; and the light-receiving element array substrate including the at least one light-receiving element array, the light-receiving element array substrate being supported in the housing, the method comprising the steps of:

(a) setting a reference original of uniform lightness distribution over the slit opening;

(b) irradiating light onto the reference original by means of the one or two light sources;

(c) receiving light reflected from the reference original and passed through the slit opening to detect a sensor-output from a photo-electric converted signal by means of the at least one light-receiving element array;

(d) aligning the width of the light-receiving element array substrate in a sub-scanning direction perpendicular to the main-scanning direction so as to incline an array-line of the at least one light-receiving element array with respect to a centerline of the slit opening to reduce a difference of distribution in the main-scanning direction of the sensor-output detected in the step (c); and (e) fixing the light-receiving element array substrate aligned in the step (d) into the housing.

8. The method according to claim 7, wherein the housing includes a plurality of portions such as holes or notches for inserting one or more adjustment components to align the light-receiving element array substrate, and wherein the step (d) further includes the step of aligning in the sub-scanning direction while adjusting the light-receiving element array substrate by the adjustment components.

9. A contact image sensor for reading an image by scanning an original comprising:

a housing;

one or two light sources for irradiating light onto a original, the one or two light sources being fixed into the housing;

a slit plate including a slit opening for passing light reflected from the original, the slit plate being fixed into the housing and the slit opening having an elongated-shape extended in a main-scanning direction;

a lens for forming an erecting unit magnification image by focusing the reflected light from the original through the slit opening of the slit plate on at least one light-receiving element array, the lens being composed of a plurality of micro-lens array plates; and a light-receiving element array substrate including the at least one light-receiving element array, the light-receiving element array substrate being supported in the housing such that the width of the light-receiving element array substrate is aligned in a sub-scanning direction perpendicular to the main-scanning direction.

10. The contact image sensor according to claim 9, wherein the housing includes a plurality of portions such as holes or notches for inserting one or more adjustment components to align the light-receiving element array substrate.

11. The contact image sensor according to claim 10, wherein the one or two light sources includes a linear illuminating device.

12. The contact image sensor according to claim 11, wherein the linear illuminating device includes at least one lead on at least one end thereof to apply power to the illuminating device, and the light-receiving element array substrate includes at least one depression, the at least one depression including a U-shaped depression or a slot-shaped depression.

13. The contact image sensor according to claim 10, wherein the lens is composed of two stacked micro-lens array plates.

14. The contact image sensor according to claim 10, wherein each of the plurality of micro-lens array plates includes a plurality of micro-lenses, the plurality of micro-lenses are arranged in a hexagonal arrangement and an array direction of the hexagonal arrangement has an inclined direction with respect to the main-scanning direction.

15. An image reading apparatus including the contact image sensor as claimed in any one of claims 9-14.

16. An image writing apparatus including the contact image sensor as claimed in any one of claims 9-14.

* * * * *

UNITED STATES PATENT AND TRADEMARK OFFICE
CERTIFICATE OF CORRECTION

PATENT NO. : 7,385,169 B2 Page 1 of 1
APPLICATION NO. : 11/516888
DATED : June 10, 2008
INVENTOR(S) : Tomihisa Saito et al.

It is certified that error appears in the above-identified patent and that said Letters Patent is hereby corrected as shown below:

On the Title Page under Item (75) Inventors

"Tomihisa Saitou" should read --Tomihisa Saito--

Signed and Sealed this

Twenty-first Day of October, 2008

JON W. DUDAS
*Director of the United States Patent and Trademark Office*